US010859702B1

(12) United States Patent
Moore et al.

(10) Patent No.: US 10,859,702 B1
(45) Date of Patent: *Dec. 8, 2020

(54) POSITIONAL TRACKING USING RETROREFLECTORS

(71) Applicant: Facebook Technologies, LLC, Menlo Park, CA (US)

(72) Inventors: David Maurice Moore, Redmond, WA (US); Evan Paul Gander, Seattle, WA (US); Jason Victor Tsai, Bellevue, WA (US); Zhaoming Zhu, Redmond, WA (US); Richard Andrew Newcombe, Seattle, WA (US); Renzo De Nardi, Seattle, WA (US); Nicholas Daniel Trail, Bothell, WA (US)

(73) Assignee: Facebook Technologies, LLC, Menlo Park, CA (US)

(*) Notice: Subject to any disclaimer, the term of this patent is extended or adjusted under 35 U.S.C. 154(b) by 354 days.

This patent is subject to a terminal disclaimer.

(21) Appl. No.: 15/853,622

(22) Filed: Dec. 22, 2017

Related U.S. Application Data

(60) Provisional application No. 62/609,290, filed on Dec. 21, 2017.

(51) Int. Cl.
| | |
|---|---|
| *G01C 3/08* | (2006.01) |
| *G01S 17/66* | (2006.01) |
| *G01S 17/10* | (2020.01) |
| *G06F 3/01* | (2006.01) |
| *G01S 7/481* | (2006.01) |

(52) U.S. Cl.
CPC ............ *G01S 17/66* (2013.01); *G01S 7/4817* (2013.01); *G01S 17/10* (2013.01); *G06F 3/012* (2013.01); *G06F 3/017* (2013.01)

(58) Field of Classification Search
CPC ........ G01S 17/66; G01S 17/10; G01S 7/4877; G06F 3/012; G06F 3/017
USPC ....................................................... 356/5.01
See application file for complete search history.

(56) References Cited

U.S. PATENT DOCUMENTS

| | | | |
|---|---|---|---|
| 5,235,183 A | 8/1993 | Whiting et al. | |
| 5,294,970 A * | 3/1994 | Dornbusch | ............... G01S 1/70 356/141.1 |
| 5,552,893 A * | 9/1996 | Akasu | ...................... G01C 3/00 356/4.01 |
| 5,831,717 A | 11/1998 | Ikebuchi | |
| 6,856,919 B1 | 2/2005 | Bastian et al. | |
| 6,947,820 B2 * | 9/2005 | Ohtomo | ............... G01C 15/004 172/4.5 |
| 7,787,134 B2 * | 8/2010 | Kohnen | ................ G01B 11/14 356/3.1 |

(Continued)

*Primary Examiner* — Mark Hellner
(74) *Attorney, Agent, or Firm* — Fenwick & West LLP

(57) ABSTRACT

Systems described herein use outside-in positional tracking. A base station emits one or more rotational light beams to illuminate a local area. The rotational light beams rotate around a rotation axis and are used for positional tracking one or more objects in the local area. The one or more rotational light beams retroreflect from the one or more objects in the local area. The one or more objects include retroreflectors that retroreflect light beams incident on them. The base station detects the retroreflected light beams. The base station generates illumination data in response to the detected light beams. A system analyzes the illumination to determine an orientation and/or a location of an object.

29 Claims, 7 Drawing Sheets

(56) References Cited

U.S. PATENT DOCUMENTS

| | | | |
|---|---|---|---|
| 9,958,960 B2 * | 5/2018 | Krah | ............... G01S 17/48 |
| 2003/0202259 A1 | 10/2003 | Nishimae et al. | |
| 2005/0110951 A1 | 5/2005 | Yancey et al. | |
| 2006/0012777 A1 | 1/2006 | Talbot et al. | |
| 2010/0020935 A1 | 1/2010 | Dafni | |
| 2012/0212727 A1 | 8/2012 | Hammes | |
| 2013/0103017 A1 | 4/2013 | Weckwerth et al. | |
| 2015/0029583 A1 | 1/2015 | Hein | |
| 2016/0076740 A1 | 3/2016 | Watanabe | |
| 2016/0266283 A1 | 9/2016 | Segawa | |
| 2017/0252859 A1 | 9/2017 | Kumkar et al. | |

* cited by examiner

240

POSITIONAL TRACKING USING RETROREFLECTORS

CROSS REFERENCE TO RELATED APPLICATIONS

This application claims the benefit of U.S. Provisional Application No. 62/609,290, filed Dec. 21, 2017, which is incorporated by reference in its entirety.

BACKGROUND

The present disclosure generally relates to positional tracking, and specifically relates to positional tracking using retroreflectors.

Positional tracking is crucial in virtual reality (VR), augmented reality (AR), and mixed reality (MR) systems because an accurate representation of physical objects such as hands and heads in a virtual world contribute towards achieving immersion and a greater sense or presence. Another reason is that positional tracking improves the 3D perception of a virtual environment if physical motion is accurately reflected in a virtual world.

Positional tracking allows a user's movement and gesture to be detected and tracked over time. As such, the user's viewpoint can possibly change according to the user's position, orientation, and motion. An exact representation of the user's hands and other objects is possible in a virtual environment. A user can touch and move a virtual object by hand gesture thereby to connect the physical and virtual worlds.

Outside-in tracking traces scene coordinates of moving objects such as head-mounted displays or motion controller peripherals in real time. An outside-in tracking process uses one or more cameras or other sensors that are placed in a stationary location and oriented towards a tracked object. The tracked object can move freely around a designated area defined by the intersecting visual ranges of the cameras. However, systems that use outside-in tracking are prone to tracking errors caused by occlusion when a tracked object is out of a camera or sensor's line of sight such that the object can no longer be tracked.

SUMMARY

In one embodiment, a device includes an illumination source that generates one or more source light beams. The device may be used as a part of a virtual reality (VR) system, an augmented reality (AR) system, a mixed reality (MR) system, or some combination thereof. The device further includes an optical module positioned along a rotation axis. The optical module divides the one or more source light beams into a first light beam and a second light beam. The first light beam and the second light beam are separated from each other by a constant angle in a plane orthogonal to the rotation axis. The device further includes a detector configured to detect the at least one light beam of the first light beam and the second light beam that is retroreflected from an object (e.g., a head-mounted display (HMD), an interface device such as a hand piece, controller, or accessory, and/or other types of devices/objects) in a local area.

In one embodiment, a system includes a base station and an object. The system can be a VR system, an AR system, a MR system, or some combination thereof. The base station emits multiple light beams including a first light beam and a second light beam that rotate around a rotation axis to illuminate a local area. The first light beam and the second light beam are separated from each other by a constant angle in a plane orthogonal to the rotation axis. At least one light beam of the first light beam and the second light beam is retroreflected from an object in the local area. The base station detects illumination by the at least one light beam that is retroreflected from the object. The base station further generates illumination data in response to the illumination. The object includes one or more retroreflectors configured to retroreflect light in a band of light that includes the first light beam and the second light beam.

In one embodiment, a device includes a processor and memory storing computer readable instructions configured to cause the processor to receive illumination data from at least one detector coupled to a base station. The illumination data is generated in response to illumination by at least one light beam. The computer readable instructions configured to cause the processor to apply a model to the illumination data to determine an orientation of an object in a local area. The at least one light beam is a first light beam and a second light beam retroreflected from the object. The first light beam and the second light beam illuminate a local area and rotate around a rotation axis, are separated from each other by a constant angle in a plane orthogonal to the rotation axis, and are generated from a source light beam having a beam waist positioned within a distance range from a center of rotation on the rotation axis.

In one embodiment, a computer-implemented method receives illumination data from at least one detector coupled to a base station. The illumination data is generated in response to illumination by at least one light beam. The computer-implemented method applies a model to the illumination data to determine an orientation of an object in a local area. The at least one light beam is a first light beam and a second light beam retroreflected from the object. The first light beam and the second light beam illuminate a local area and rotate around a rotation axis, are separated from each other by a constant angle in a plane orthogonal to the rotation axis, and are generated from a source light beam having a beam waist positioned within a distance range from a center of rotation on the rotation axis.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Systems described herein use outside-in positional tracking. A base station emits one or more rotational light beams for positional tracking of one or more objects (e.g., a head-mounted display (HMD), an interface device such as a hand piece, controller, or accessory, and/or other types of devices/objects) in a local area. The one or more rotational light beams are typically in the IR range and rotate around a rotation axis at a rotational speed on. When multiple rotational light beams are used, each two rotational light beams are separated by a constant angle in a plane that is orthogonal to the rotation axis. The two light beams together illuminate the local area where the one or more objects are located. Each of the one or more objects that is being tracked includes retroreflectors that retroreflect the rotational beams. The base station detects illumination and generates illumination data including at least temporal information of the illumination. In particular, the base station includes multiple detectors distributed across its exterior surface to generate the illumination data. The illumination data can be analyzed in reference to the detectors' as well as retroreflectors' positions to determine the orientation of an object. The illumination data can also be analyzed to determine a position of the object. Compared to systems where active tracking and detection electronics are included in tracked objects, systems described herein include the active tracking and detection electronics in base stations. As a result, tracked objects are lighter, simpler, and have smaller form factors. Furthermore, systems described herein can retrofit tracked objects by mounting retroreflectors onto conventional objects.

System Overview

Figure 1:
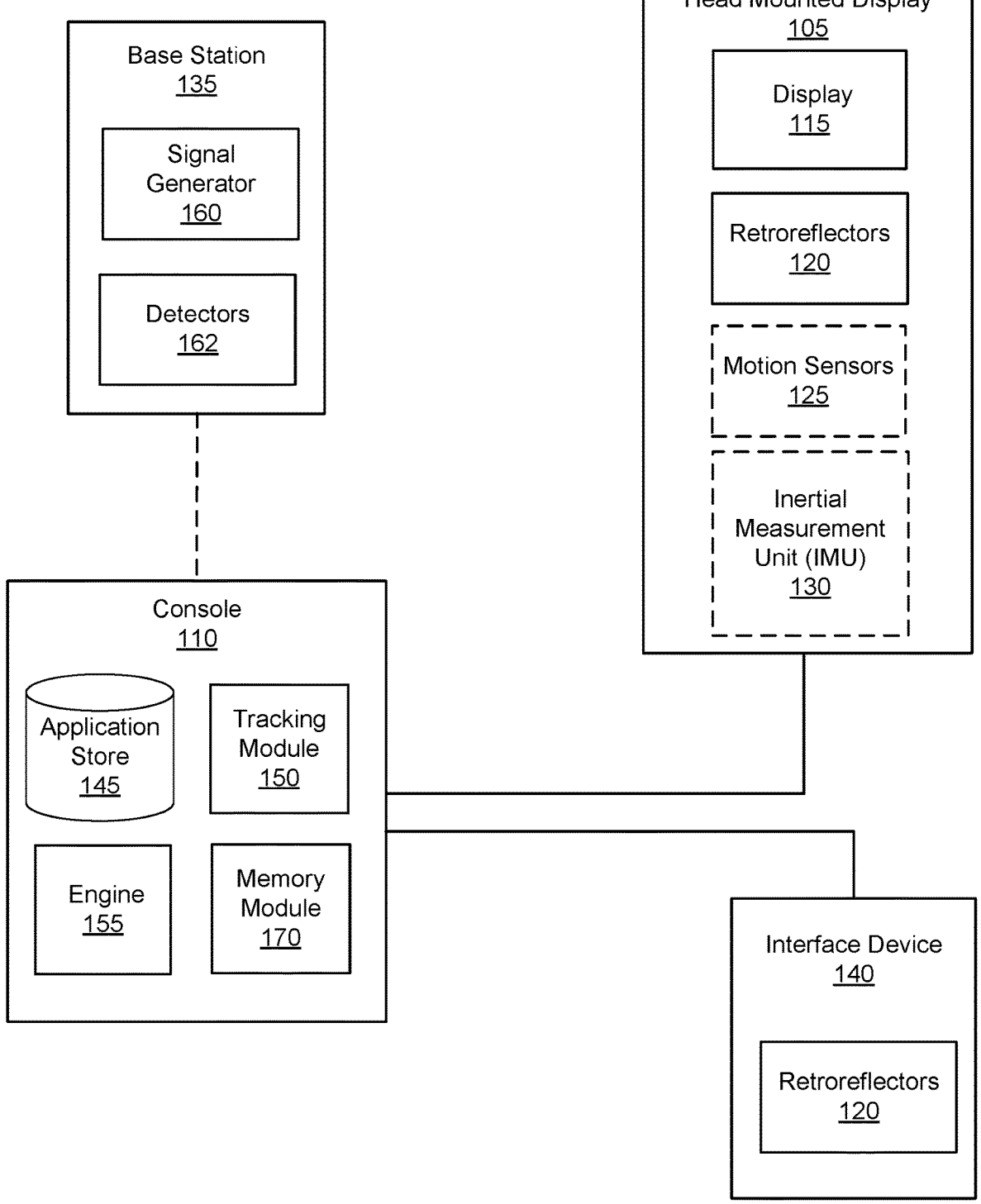
FIG. 1 is a block diagram of a system that uses asymmetric light beams for positional tracking, in accordance with an embodiment.

FIG. 1 is a block diagram of a system 100 that tracks position of one or more objects in a local area such as an HMD or an interface device using light beams that have a constant apparent frequency throughout a local area, in accordance with an embodiment. The system 100 may be a virtual reality (VR) system, an augmented reality (AR) system, a mixed reality (MR) system, or some combination thereof. The system 100 shown by FIG. 1 comprises a HMD 105, a base station 135, and an interface device 140 that are each communicatively coupled to the console 110. In some embodiments, the base station 135 is not coupled to the console 110. The base station 135 may be separate from and/or integrated with the console 110. In some embodiments, the console 110 may also act as an AR and/or MR console. In these embodiments, the console 110 provides computer-generated elements (e.g., images, videos, sound, etc.) that augment views of a physical, real-world environment. While FIG. 1 shows an example system 100 including one HMD 105, one base station 135, and one interface device 140, in other embodiments any number of these components may be included in the system 100. For example, there may be multiple HMDs 105 each having an associated interface device 140 and detecting signals (e.g., light beams) emitted from the one or more base stations 135; with each HMD 105, interface device 140, and/or base stations 135 communicating with the console 110. In alternative configurations, different and/or additional components may be included in the system 100. Furthermore, in alternative configurations, any one or combination of components for the system 100 described herein may be combined within a given device (e.g., the HMD 105 includes the tracking module 150 and optionally the engine 155 such that the HMD 105 is configured to track its own movement, position, and/or orientation in the local area without or in addition to the console 110, or the base station 135 includes the tracking module 150 and optionally the engine 155 such that the base station 135 is configured to track the movement, position, and/or orientation of an object in the local area). Light beams are used as example signals emitted by the base station 135 and detected by the HMD 105 for positional tracking throughout the description herein. In some embodiments, the base station 135 may be modified to emit non-optical signals such as acoustic signals, microwave signals, and the like can also be used.

The base station 135 emits signals (e.g., light beams, acoustic beams) for positional tracking and detects signals retroreflected from objects being tracked. The base station 135 emits at least two light beams that rotate around a rotation axis. The at least two light beams illuminate the local area. A position and/or orientation of an object (e.g., the HMD 105) located in the local area affects how the at least two light beams illuminate the object. Accordingly, the object's position and/or orientation can be determined by analyzing illumination of the object by the at least two light beams. The base station 135 emits two light beams that rotate around the rotation axis at the same rotational speed $\omega_1$ (e.g., 60 Hz). In some embodiments, the base station 135 additionally emits a light beam that rotates around the rotation axis at a rotational speed $\omega_2$ that is different from the rotational speed $\omega_1$ at which the at least two light beams are emitted. In other embodiments, the base station 135 additionally broadcasts a reference signal periodically to indicate a reference position for determining the position and/or orientation of the object. The reference signals are broadcasted at the same frequency as the rotational speed of the two light beams. In one embodiment, a synchronization signal includes a light beam of a predetermined wavelength for a predetermined time interval. For example, the synchronization signal includes visible light that flashes periodically. The base station 135 includes a signal generator 160 and a plurality of detectors 162. The signal generator 160 includes an illumination source, an optical module, and a rotor assembly. In other embodiments, the base station 135 comprises additional or fewer modules than those described herein. Similarly, the functions can be distributed among the modules and/or different entities (e.g., the console 110) in a different manner than is described here.

The illumination source emits at least one source light beam. The at least one source light beam is the source of the light beams that exit the base station 135. The at least one source light beam is optically processed into multiple light beams that exit the base station. The illumination source is positioned such that its center is aligned with a rotation axis around which the rotor assembly rotates. Accordingly, the at least one source light beam traverses along the rotation axis. The illumination source emits light having different wavelengths such as those in the visible band (~380 nm to 750 nm), in the infrared (IR) band (~750 nm to 1 mm), in the ultraviolet band (~10 nm to 380 nm), some other portion of the electromagnetic spectrum, or some combination thereof. In some embodiments, the illumination source emits light that is in the IR band. The illumination source may include an LED such as a high power LED or a laser LED, or other light sources. The optical module receives the source light beam and divides the source light beam into at least two light beams. The at least two light beams are separated from each other by an angle in a plane that is orthogonal to the rotation axis. The angle has a constant value that may be preconfigured. The plane that is orthogonal to the rotation axis is hereinafter referred to as "the orthogonal plane." The optical module may include optical elements such as a Fresnel lens, a convex lens, a concave lens, and the like that collimate the at least two light beams before they exit the base station 135. In some embodiments, the at least two beams that exit the base station 135 are shaped in planar sheets. The light beams that are shaped in planar sheets are hereinafter referred to as "planar sheet beams." A planar sheet beam may be tilted with reference to the orthogonal plane. In other embodiments, the at least two beams that exit the base station 135 are collimated beams. In some embodiments, the optical module divides the source light beam into two light beams. In others, the optical module divides the source light beam into three light beams. The optical module is positioned such that its center overlaps a center of rotation.

In various embodiments, the base station 135 is configured such that an apparent frequency of a retroreflected beam is constant throughout a local area. The retroreflected beam is a light beam emitted by the base station 135 that is retroreflected from an object in the local area. The apparent frequency of the retroreflected beam is proportional to the apparent frequency of the light beam emitted by the base station 135 if retroreflected by an object. At a particular location in the local area, the apparent frequency of the light beam emitted by the base station 135 can be determined based on a velocity and a pulse width of an intensity profile of the light beam emitted by the base station 135. The pulse width of the intensity of the light beam at the particular location changes as a function of a radial distance from the location of its beam waist to the particular location. The velocity of the rotational beam is determined by its rotational speed and a distance from a center of rotation to the particular location. The pulse width of the intensity profile of the retroreflected beam changes as a function of a propagation distance from the location of the beam waist of the light beam emitted by the base station.

The center of rotation is a point on the rotation axis where the rotational beams intersect. The illumination source and the optical module are positioned such that the location of the beam waist of the source light beam is separated from the center of rotation by a distance that is selected from a distance range. The distance range is selected such that a variation in the apparent frequency of any rotational beam within a predetermined area surrounding the base station is within a threshold. That is, the optical module is separated from the beam waist of the source light beam by the distance. In some embodiments, the illumination source and the optical module are positioned such that the optical module overlaps the beam waist of the source light beam. In this case, the beam waist of the source light beam overlaps the center of rotation. In some embodiments, the illumination source and the optical module are positioned such that the source beam arrives at the optical module before it reaches its beam waist. In this case, the beam waist of the source light beam is further away from the illumination source 202 than the optical module.

The rotor assembly rotates at least a portion of the optical module around the rotation axis such that the at least two light beams are output from the base station 135 in a direction that rotate around the rotation axis. The rotor assembly includes at least one rotor. The illumination source, the optical module, and the rotor assembly are further described in detail with respect to FIGS. 2A and 3.

The detectors 162 detect signals (e.g., light flashes, light beams, acoustic signals) emitted from the base station 135 that are retroreflected from objects in the local area. In some embodiments, responsive to being illuminated, the detectors 162 output illumination data. Illumination data is data that includes illumination information of the detectors 162. The illumination data includes a starting time point of illumination, an end time point of illumination, an intensity of illumination, other characteristics of illumination, or some combination thereof. In some embodiments, the detectors 162 include a photodetector (e.g., an avalanche photodiode, a single-photon avalanche diode, a photodiode, a phototransistor, etc.) that detects light and converts detected photons into electrical signals.

The detectors 162 are configured to detect light emitted by the base station 135 that is retroreflected by retroreflectors on objects being tracked, and output a signal corresponding to an apparent frequency of the light detected. To mitigate an effect of a location of the object on the apparent frequency the light detected by the detector 162, the pulse width of the intensity profile of the light can be regulated such that it also increases with the radial distance from the base station 135 linearly or substantially linearly. As such, the apparent frequency of the light detected is regulated to be constant throughout the local area. As such, an object oriented at a particular orientation at different locations in the local area, reflects light having the same or substantially the same apparent frequency. A detector 162 therefore observes light having the same or substantially the same apparent frequency and has the same or substantially the same frequency response. Accordingly, a detector 162 generates the same or substantially the same illumination data corresponding to objects positioned at different locations in the local area. By positioning a beam waist of the source light beam relative to the center of rotation, the pulse width of the intensity profile of the light can be regulated to linearly or substantially linearly increase with the radial distance from the base station 135.

The detectors 162 together output illumination data that provides information as to an orientation of the HMD 105. For example, an exposure interval can be determined from a starting time point and an end time point. The determined orientation can be a relative orientation in reference to the base station 135. As another example, an incident angle of a light beam on a detector 162 can be determined from an intensity of illumination. The exposure interval of illumination and/or the incident angle can be used to determine an orientation of the HMD 105. A location of the HMD 105 can be determined in a similar manner.

The detectors 162 are located in specific positions on the base station 135 relative to each other such that they together output illumination data for determining an orientation of the HMD 105. Specifically, the detectors 162 are placed along one or more exterior surfaces of the base station 135 to detect light from all directions surrounding the base station 135. The detectors 162 together output illumination data for determining an orientation of an object in the local area. In some embodiments, the detectors 162 are equally spaced. The detectors 162 may be placed on the exterior surface such that they not visible to users. For example, an exterior surface may include openings (e.g., holes) for housing the detectors 162. The exterior surface may also include apertures or sections that are transparent in the band of light emitted by the base station 135 to allow all light or light of certain wavelengths to reach the detectors 162.

The HMD 105 is a head-mounted display that presents media to a user. The media presented by the HMD 105 include visual and/or audio media content. In some embodiments, audio content is presented via an external device (e.g., speakers and/or headphones) that receives data including the audio content from the HMD 105, the console 110, or both, and presents the audio content based on the data. An embodiment of the HMD 105 is further described below with reference to FIG. 5. The HMD 105 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other. In some embodiments, the HMD 105 may also act as an AR and/or MR HMD. In these embodiments, the HMD 105 augments views of a physical, real-world environment with computer-generated elements (e.g., images, video, sound, etc.).

The HMD 105 includes a display 115 and multiple retroreflectors 120. The display 115 displays 2D or 3D images to the user in accordance with data received from the console 110. In some embodiments, the display 115 includes a display block and an optics block. The display block includes a single electronic display panel or multiple electronic display panels (e.g., a display panel for each eye of a user). Examples of the electronic display panel include: a liquid crystal display (LCD), an organic light emitting diode (OLED) display, an active-matrix organic light-emitting diode display (AMOLED), some other display, or some combination thereof. In some embodiments, portions (e.g., a front side) of the HMD 105 are transparent to visible light thereby to allow a user of the headset to view the local area through those portions. In these embodiments, the display 115 is made up of one or more transparent electronic display panels. A transparent electronic display panel is partially or fully transparent and may be, for example, a transparent organic light emitting diode display (TOLED), some other transparent electronic display, or some combination thereof.

The optics block includes one or more optical elements that transmit images from the display block to eyes of the user. The optics block magnifies image light received from the display block, corrects optical errors associated with the image light, and presents the corrected image light to a user of the HMD 105. In various embodiments, the optics block includes one or more optical elements. Example optical elements included in the optics block include: an aperture, a Fresnel lens, a convex lens, a concave lens, a filter, a mirror element, or any other suitable optical element that affects image light. Moreover, the optics block may include combinations of different optical elements. In some embodiments, one or more of the optical elements in the optics block may have one or more coatings, such as anti-reflective coatings.

The optics block may magnify and focus image light thereby to allow using a display block that is physically smaller and lighter in weight, and consumes less power than using a display block without any magnification or focusing when presenting the same content. Additionally, magnification may increase the field of view of the content presented by the HMD 105. For example, the field of view of the displayed content is such that the displayed content is presented using almost all (e.g., approximately 110 degrees diagonal), and in some cases all, of the user's field of view. Additionally in some embodiments, the amount of magnification may be adjusted by adding or removing optical elements.

In some embodiments, the optics block may be designed to correct one or more types of optical error. Examples of optical error include barrel distortions, pincushion distortions, longitudinal chromatic aberrations, or transverse chromatic aberrations. Other types of optical errors may further include spherical aberrations, comatic aberrations or errors due to the lens field curvature, astigmatisms, or any other type of optical error. In some embodiments, content provided to the display 115 for display is pre-distorted, and the optics block corrects the distortion when it receives image light from the display block generated based on the content. In some embodiments, some or all of the functionality of the display block is part of the optics block or vice versa.

The retroreflectors 120 are passive devices that retroreflect light incident on the HMD 105. A retroreflector 120 reflects light emitted by the base station 135 incident on the retroreflector 120 back to the base station 135 with an amount of scattering within a predetermined tolerance that is acceptable to those skilled in the art. In various embodiments, the predefined tolerance can be, for example, a 1% tolerance, a 2% tolerance, a 5% tolerance, etc. The retroreflectors 120 can include a corner reflector or a cat's eye. The retroreflectors 120 are placed along one or more exterior surfaces or one or more edges of the HMD 105. In some embodiments, the retroreflectors 120 are equally spaced. The retroreflectors 120 may be placed on the exterior surface such that they are not visible to users. For example, an exterior surface may include openings (e.g., holes) for housing the retroreflectors 120. The exterior surface may also include apertures or sections that are transparent in the band of light emitted by the base station 135 to allow all light or light of certain wavelengths to reach the retroreflectors 120. Compared to systems where active tracking and detection electronics are included in tracked objects, systems described herein include the active tracking and detection electronics in base stations. As a result, tracked objects are lighter, simpler, and have smaller form factors. Furthermore, systems described herein can retrofit tracked objects by mounting retroreflectors onto conventional objects.

In some embodiments, the HMD 105 may further include one or more motion sensors 125 and an inertial measurement unit (IMU) 130. The IMU 130 is an electronic device that generates IMU position data based on measurement signals received from one or more of the motion sensors 125. A motion sensor 125 generates one or more measurement signals in response to motion of the HMD 105. Examples of motion sensors 125 include: one or more accelerometers, one or more gyroscopes, one or more magnetometers, another suitable type of sensor that detects motion, a type of sensor used for error correction of the IMU 130, or some combination thereof. The motion sensors 125 may be located external to the IMU 130, internal to the IMU 130, or some combination thereof.

Based on the one or more measurement signals from one or more motion sensors 125, the IMU 130 generates IMU position data indicating an estimated position of the HMD 105 relative to an initial position of the HMD 105. For example, the motion sensors 125 include multiple accelerometers to measure translational motion (forward/back, up/down, left/right) and multiple gyroscopes to measure rotational motion (e.g., pitch, yaw, roll). In some embodiments, the IMU 130 rapidly samples the measurement signals and calculates the estimated position of the HMD 105 from the sampled data. For example, the IMU 130 integrates the measurement signals received from the accelerometers over time to estimate a velocity vector and integrates the velocity vector over time to determine an estimated position of a reference point on the HMD 105. Alternatively, the IMU 130 provides the sampled measurement signals to the console 110, which determines the IMU position data. The reference point is a point that may be used to describe the position of the HMD 105. While the reference point may generally be defined as a point in space; however, in practice the reference point is defined as a point within the HMD 105 (e.g., a center of the IMU 130).

The IMU 130 receives one or more calibration parameters from the console 110. As further discussed below, the one or more calibration parameters are used to maintain tracking of the HMD 105. Based on a received calibration parameter, the IMU 130 may adjust one or more IMU parameters (e.g., sample rate). In some embodiments, certain calibration parameters cause the IMU 130 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The interface device 140 is a device that allows a user to send action requests to the console 110. An action request is a request to perform a particular action. For example, an action request may be to start or end an application or to perform a particular action within the application. The interface device 140 may include one or more input devices. Example input devices include: a keyboard, a mouse, a game controller, a wearable instrument (e.g., a wristband, a glove, a knee pad, etc.), or any other suitable device for receiving action requests and communicating the received action requests to the console 110. An action request received by the interface device 140 is communicated to the console 110, which performs an action corresponding to the action request. In some embodiments, the interface device 140 may provide haptic feedback to the user in accordance with instructions received from the console 110. For example, haptic feedback is provided when an action request is received, or the console 110 communicates instructions to the interface device 140 causing the interface device 140 to generate haptic feedback when the console 110 performs an action. The interface device 140 can also include one or more retroreflectors 120 to enable the system 100 to track positions of the interface device 140, similar to the positional tracking of the HMD 105 as described herein.

The console 110 provides media to the HMD 105 for presentation to the user in accordance with information received from one or more of: the base station 135, the HMD 105, and the interface device 140. In the example shown in FIG. 1, the console 110 includes an application store 145, a tracking module 150, an engine 155, and a memory module 170. Similarly, the functions can be distributed among the modules and/or different entities (e.g., the HMD 105) in a different manner than is described here. For example, some (e.g., the tracking module 150) or all (i.e., the console is part of the HMD 105) of the modules may be part of the HMD 105.

The application store 145 stores one or more applications for execution by the console 110. An application is a group of instructions, that when executed by a processor, generates content for presentation to the user. Content generated by an application may be in response to inputs received from the user via movement of the HR headset 105 or the interface device 140. Examples of applications include: gaming applications, conferencing applications, video playback application, or other suitable applications.

The tracking module 150 calibrates the system 100 using one or more calibration parameters and may adjust one or more calibration parameters to reduce error in determination of the position of the HMD 105. Moreover, calibration performed by the tracking module 150 also accounts for information received from the motion sensors 125 and/or the IMU 130.

The tracking module 150 tracks movements of the objects in the local area using the illumination data. For example, the tracking module 150 applies a model to the illumination data to determine an orientation of the HMD 105. The model observes relationships between illumination data and corresponding orientation of the HMD 105. For example, the model includes a spatial model of detector locations relative to a reference vector (e.g., a known position inside the tracked object). The tracking module 150 warps the model to illumination data to determine an orientation of the HMD 105. A location of the HMD 105 can be determined in a similar manner by using a model that observes relationships between illumination data and corresponding location of the HMD 105. The tracking module 150 may select the model based on a location of the base station 135, the first rotational speed, and/or the offset angle. The location of the base station 135 includes a radial distance of the base station 135 from the console 110 and a height of the base station 135 relative to the ground. The tracking module 150 may obtain a model from a library that includes models developed for different types of HMDs 105. The tracking module 150 may also create a model for the HMD 105. For example, the tracking module 150 develops and/or updates the model using illumination data collected when the HMD 105 is at different positions for the purpose of online calibration. IMU position data can also be used for positional tracking. The tracking module 150 also determines positions of a reference point of the HMD 105 using position information from the IMU position data. Additionally, in some embodiments, the tracking module 150 may use portions of the illumination data, IMU position data or some combination thereof, to predict a future position of the HMD 105. The tracking module 150 provides the estimated or predicted future position of the HMD 105 to the engine 155.

The tracking module 140 identifies illumination data to be used for positional tracking. From illumination data generated by the base station 135, the tracking module 140 determines illumination data generated corresponding to the outgoing beams that rotate at the first rotational speed. The tracking module 140 analyzes temporal relationships of the captured illumination data to determine rotational speeds thereby to make the determination. In some embodiments, the tracking module 140 may further analyze intensity information in the captured illumination data to make the determination.

In some embodiments, the console 110 calibrates the base station 135 and/or the HMD 105. The console 110 provides calibration parameters to one or more of the signal generator 160, the detectors 162, the motion sensors 125, and the IMU 130 for calibration. For example, a user follows instructions and positions the HMD 105 into predetermined positions. The console 110 provides instructions for display on the display 115 to prompt the user to position the HMD 105 into predetermined positions, and records illumination data outputted by the HMD 105 at each predetermined position.

The engine 155 executes applications within the system environment 100 and receives position information, acceleration information, velocity information, predicted future positions, or some combination thereof of the HMD 105 from the tracking module 150. Based on the received information, the engine 155 determines content to provide to the HMD 105 for presentation to the user. For example, if the received information indicates that the user has looked to the left, the engine 155 generates content for the HMD 105 that mirrors the user's movement in a virtual environment. Additionally, the engine 155 performs an action within an application executing on the console 110 in response to an action request received from the interface device 140 and provides feedback to the user that the action was performed. The provided feedback may be visual or audible feedback via the HMD 105 or haptic feedback via the interface device 140.

The memory module 170 stores instructions for execution by the console 110 and stores data used by the console 110. The instructions, when executed by a processor, cause the console 110 to perform operations such as receiving illumination data, identifying illumination data to use for determining an orientation of an object in a local area, determining the orientation of the object in the local area, selecting models for determining the orientation of the object, calibrating objects, devices, and/or other modules, and the like. The memory module 170 includes a non-transitory computer-readable storage medium such as a hard drive, compact disk read-only memory (CD-ROM), DVD, or a solid-state memory device.

The system 100 can also track other objects that are in the local area but not part of the system 100. For example, the system 100 can track a position of a personal item (e.g., a remote controller, a key, etc.) in the local area. The base station 135 described can be used separately from the system 100. The base station 135 can also be integrated with other devices such as a home assistant.

Figure 2A:
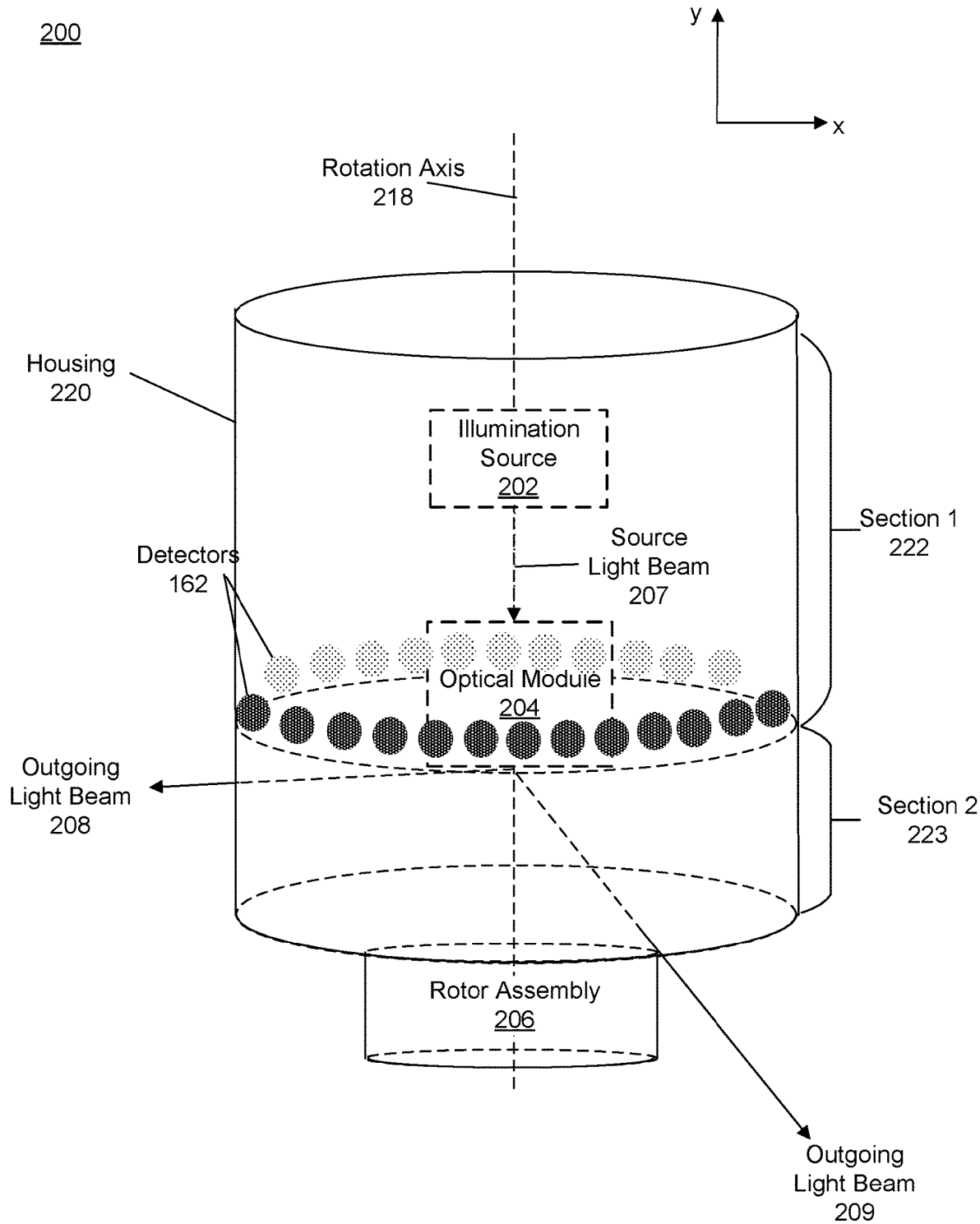
FIG. 2A is an isometric view of an example base station, in accordance with an embodiment.

FIG. 2A is an isometric view of an example base station 200, in accordance with an embodiment. The example base station 200 is an embodiment of the base station 135, and includes the detectors 162, an illumination source 202, an optical module 204, and a rotor assembly 206. The illumination source 202, the optical module 204, and the rotor assembly 206 are included in the signal generator 160. At least the illumination source 202 and the optical module 204 are enclosed by a housing 220. In the illustrated example, the rotor assembly 206 is external to the housing 220. However, the rotor assembly 206 can also be completely or partially enclosed by the housing 220. The rotor assembly 206 is configured to drive the optical module 204 to rotate along a rotation axis 218. The rotor assembly 206 may also drive the entire housing 220 or a portion of the housing 220 to rotate. The housing 220 is shaped such that its rotation does not cause vibration or disturbance forces to the rotor assembly 206. For example, as illustrated, the housing is cylindrically-shaped. The housing 220 includes one or more apertures or sections that are transparent to allow light to pass through thereby to exit the housing 220. A transparent section may allow light of some wavelengths to pass through while blocking light of other wavelengths. The rest of the housing 220 may be of materials that are substantially opaque to visible light. For example, in the illustrated example, the housing 220 includes a section 222 that is not transmissive to light emitted by the illumination source 202 and a section 223 that is transmissive.

The illumination source 202 emits a source light beam 207. In various embodiments, the illumination source 202 is positioned such that its center is aligned with the rotation axis 218 and the source light beam 207 traverses along the rotation axis 218. The illumination source 202 includes a laser source that emits light. As noted above, the light may be in the IR band, the visible band, the UV band, or some combination thereof. For example, the source light beam 207 has a wavelength in the range of 750 to 940 micrometer (um). The illumination source 202 is optically coupled to the optical module 204. The illumination source 202 can include an optical element such as a Fresnel lens, a convex lens, a concave lens, and the like that collimates the light beam 207. Adjusting the optical element can adjust a location of the beam waist of the light beam 207.

The optical module 204 divides the source light beam 207 into at least two output light beams. The output light beams of the optical module 204 may be further optically processed before exiting the housing 220 as the outgoing light beams 208, 209. The outgoing light beams 208, 209 illuminate a local area where one or more objects are located. The optical module 204 is positioned such that the rotation axis 218 passes a center of the optical module 204. The optical module 204 is positioned at a center of rotation.

In various embodiments, the source light beam 207 is a collimated beam. However, the source light beam 207 diverges. That is, a beamwidth of the source light beam 207 varies as it propagates along the rotation axis 218 as a function of the radial distance away from the illumination source 202. For example, the beamwidth of the source light beam 207 decreases and then increases as a function of the radial distance away from the illumination source 202. At its beam waist, the source light beam 207 has the smallest beamwidth. The optical module 204 is positioned to minimize or to substantially minimize a variance in the apparent frequency of the outgoing light beams 208, 209 throughout the local area. As such, the outgoing light beams 208, 209 that illuminate the local area have a constant apparent frequency throughout the local area. For example, the optical module 204 is positioned at a distance away from the illumination source 202. The distance is selected from a distance range such that an amount of decrease of beamwidths of the outgoing light beams 208, 209 is within a threshold amount as they exit the base station 200. In some embodiments, the optical module 204 is positioned relative to the illumination source 202 such that the beam waist of the illumination source 202 overlaps the optical module 204. That is, the optical module 204 is positioned such that the source light beam 207 arrives along the rotation axis 218 at the optical module 204 at its smallest beamwidth. This way, the beamwidth of the outgoing light beams 208, 209 only increases with the radial distance in the local area and the apparent frequency of the outgoing light beams 208, 209 are constant throughout the local area. Adjusting the optical element of the illumination source 202 can adjust the relative positioning between the beam waist of the illumination source 202 and the optical module 204. As another example, the optical module 204 is positioned at a distance away from the illumination source 202 where the source light beam 207 arrives at the optical module 204 at a predetermined beamwidth prior to reaching its beam waist. In this case, the beamwidth of the outgoing light beams 208, 209 decreases within a predetermined threshold before it increases with the radial distance in the local area. The apparent frequencies of the outgoing light beams 208, 209 are constant throughout the local area. Accordingly, the apparent frequencies of light beams that are the outgoing light beams 208, 209 retroreflected from any object in the local area are constant throughout the local area.

In some embodiments, the source light beam 207 is divided and processed such that the outgoing light beams 208, 209 are planar sheet beams. The outgoing light beams 208, 209 are separated by an angle in the orthogonal plane as further described below. This angle is also referred herein as an offset angle. In addition, the outgoing light beams 208, 209 are tilted with respect to the orthogonal plane by opposite angles as further described below.

The optical module 204 may include one or more prisms, mirrors, and/or other optical elements that alter how light propagates thereby to separate a single light beam into multiple light beams. For example, in one embodiment, the optical module 204 includes a prism including materials of different refraction indexes such that it separates an incoming light beam into separate light beams that are further optically processed into the outgoing light beams 208, 209. In another embodiment, the optical module 204 includes a diffractive beam splitter that separates the source light beam 207 into two light beams that are further optically processed into the outgoing light beams 208, 209. In some embodiments, the optical module 204 further includes one or more optical elements for shaping the light beams 208, 209. In some embodiments, the optical module 204 includes optical elements such as one or more cylindrical lenses, Fresnel lenses, or some other optical elements, that convert light into a planar sheet.

In some embodiments, the rotor assembly 206 rotates the optical module 204 to rotate around the rotation axis 218 such that the separate outgoing light beams 208, 209 rotate around the rotation axis 218 at a rotational speed on. The rotor assembly 206 includes at least one rotor (not shown). In some embodiments, the base station 200 periodically broadcasts a reference signal (not shown). The reference signal is used to indicate to the detectors 162 a reference time for determining an orientation and/or position of the detectors 162.

As illustrated, the detectors 162 are dispersed on an exterior surface of a housing 220. The illustrated example shows the detectors 162 that are positioned on the exterior surface of the housing 220. In other embodiments, the detectors 162 are positioned on the exterior surface of the base station 135 such that they not visible to a user.

Figure 2B:
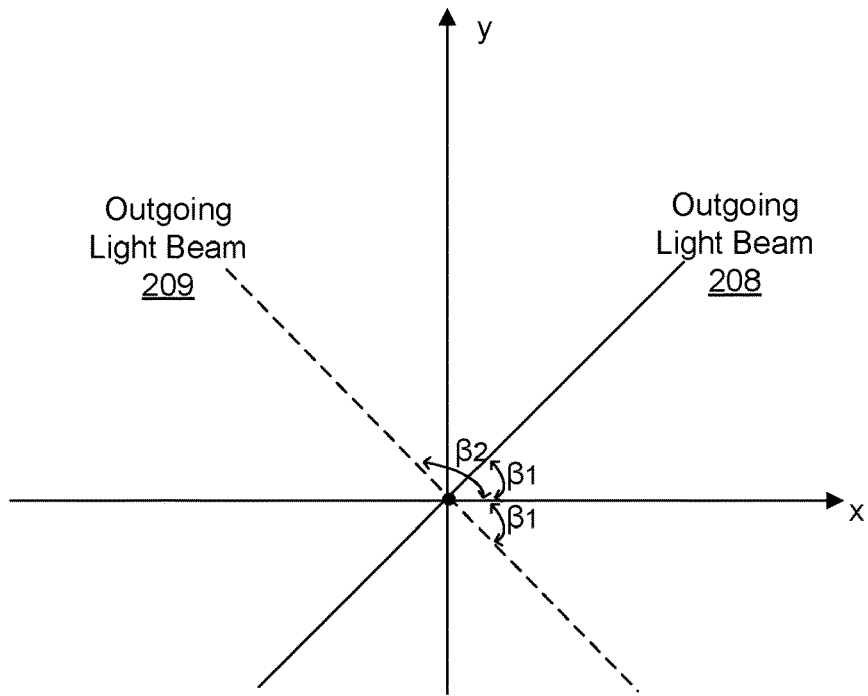
FIG. 2B is an orthogonal projected view of the outgoing light beams illustrated in FIG. 2A viewed at two separate times, in accordance with an embodiment.

FIG. 2B is an orthogonal projected view 240 of the outgoing light beams 208, 209 illustrated in FIG. 2A viewed at two separate times, in accordance with an embodiment. In the view 240, the y-axis overlaps with the rotational axis 218, and the x-axis is parallel to a horizontal reference for the base station. The view 240 is looking back towards the base station 200 from a static position. At time $t_1$, the outgoing light beam 208 appears as a planar sheet at an angle $\beta_1$ from the x-axis. At time $t_2$, the outgoing light beam 209 appears as a planar sheet at an angle $\beta_2$ from the x-axis. The angles $\beta_1$, $\beta_2$ are supplementary. The angles $\beta_1$, $\beta_2$ can be adjusted to adjust a field of view. The outgoing light beams 208, 209 appear at the illustrated position every time interval $T_1$ ($1/\omega_1$).

Figure 2C:
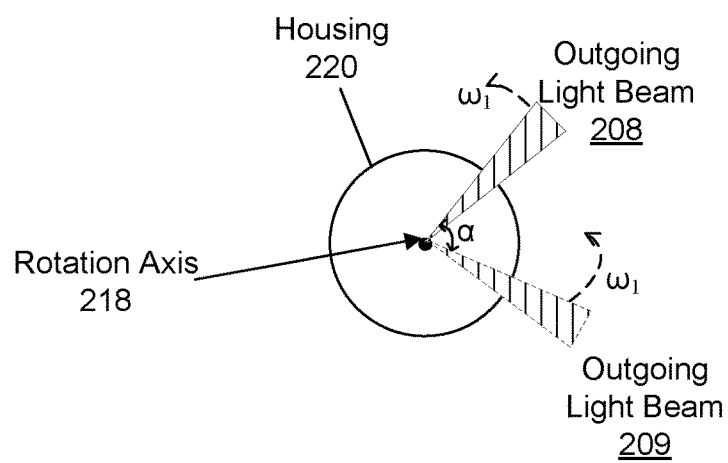
FIG. 2C is a top view of the base station illustrated in FIG. 2A, where the central dot represents the location of the rotation axis, in accordance with an embodiment.

FIG. 2C is a top view of the base station 200 illustrated in FIG. 2A, where the central dot represents the location of the rotation axis 218. The outgoing light beams 208, 209 are illustrated in triangles because they are planar sheet beams and tilted with respect to the orthogonal plane. The outgoing light beams 208 and 209 are offset by an angle α in the orthogonal plane. Because the outgoing light beams 208 and 209 rotate around the rotation axis 218 at the same rotational speed on, this offset angle α is maintained between them. For each individual detector of the multiple detectors that are located on one surface, a time interval between the outgoing light beams 208, 209 illuminating the individual detector can be recorded. Because the relative locations of the detectors and the offset angle α are known, the surface's tilt with respect to a vertical reference axis can be determined. This vertical reference axis is orthogonal to the ground and passes a center of the HMD 105. In some embodiments, a polar angle of each individual detector's with reference to this vertical reference axis is determined.

The outgoing light beams 208 and 209 are tilted with respect to the orthogonal plane. Because the outgoing light beams 208, 209 are planar sheet beams, the planes defined by the outgoing light beams 208, 209 sweep the local area when the outgoing light beams 208, 209 rotate throughout the local area. For each individual detector of the multiple detectors that are located on one surface, a terminal interval between the outgoing light beams 208, 209 illuminating the individual detector is recorded. Because the relative locations of the detectors, the offset angle α, and the tilt of each beam with respect to the orthogonal plane are known, the surface's tilt with respect to the orthogonal plane can be determined. For example, a relative position of the detectors' orthogonal projections in the orthogonal plane can be determined. The surface's tilt with respect to the orthogonal plane is determined by comparing the determined relative positions of the detector's orthogonal projections to their actual relative positions on the surface.

Figure 3:
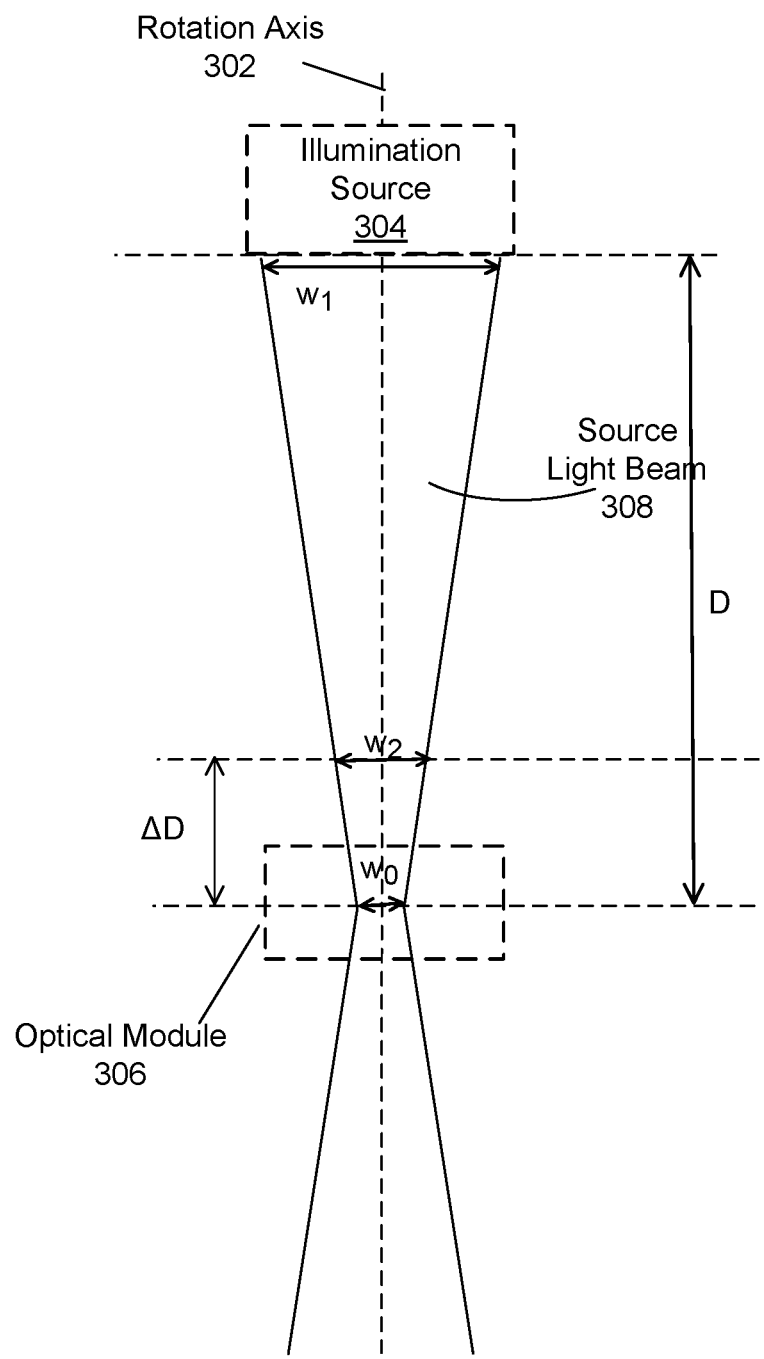
FIG. 3 is a cross section view of an example illumination source emitting an example source light beam, in accordance with an embodiment.

FIG. 3 is a cross section view of an example illumination source 304 emitting an example source light beam in accordance with an embodiment. To illustrate positioning of the optical module 204 relative to a beam waist of the source light beam 308 emitted from the illumination source 304, division of the source light beam 207 into multiple beams is not shown, for ease of illustration. The illumination source 202 and the optical module 204 are positioned such that their centers are aligned to the rotation axis 218. The illumination source 202 emits the source light beam 207 that is a collimated beam. The center axis of the source light beam 207 overlaps the rotation axis 218. In the illustrated example, the source light beam 207 diverges. The source light beam 207 is focused at a distance D away from the illumination source 202, where the source light beam 207 is at its beam waist. At this location, the source light beam has a beamwidth $w_0$. At the illumination source 202, the source light beam 207 has a beamwidth $w_1$. The beamwidth of source light beam 207 increases from its beam waist as a function of the radial distance from the location of the beam waist.

A center of the optical module 204 is positioned on the rotation axis 218 and separated from a center of the illumination source 202 by a distance that is within the range of (D-ΔD) to D. The distance D is selected by at least considering factors such as a base station size and a beam divergence. Because the beamwidth diverges slowly in a region near its beam waist, the source light beam 207 arrives at the optical module 204 having a beamwidth that is in the range of $w_0$ to $w_2$, where $w_2$ is substantially equal to $w_0$. Because the source light beam 207 is divided into the outgoing light beams 208, 209, the outgoing light beams 208, 209 share the same divergence characteristics as the source light beam 207. That is, the beamwidths of the outgoing light beams 208, 209 vary as a function of the radial distance from the location of the beam waist that is the same as another function of the radial distance from the location of the beam waist as which the beamwidth of the source light beam 207 varies. By positioning the optical module 204 at the beam waist of the source light beam 207, the pulse widths of the intensity profiles of the outgoing light beams 208, 209 increase as a function of the radial distance from the location of the beam waist linearly or substantially linearly. Because the velocity of each of the outgoing light beams 208, 209 increases linearly with the radial distance and an apparent frequency can be determined as the pulse width of the intensity profile divided by the velocity, the outgoing light beams 208, 209 each have a constant apparent frequency throughout the local area. As such, for a particular object, the outgoing light beams 208, 209 illuminate the object for constant or substantially constant time intervals throughout the local area at a particular rotational speed. Because the object reflects the outgoing light beams 208, 209, the detector 162 outputs the same or substantially the same illumination data responsive to the illumination.

Figure 4:
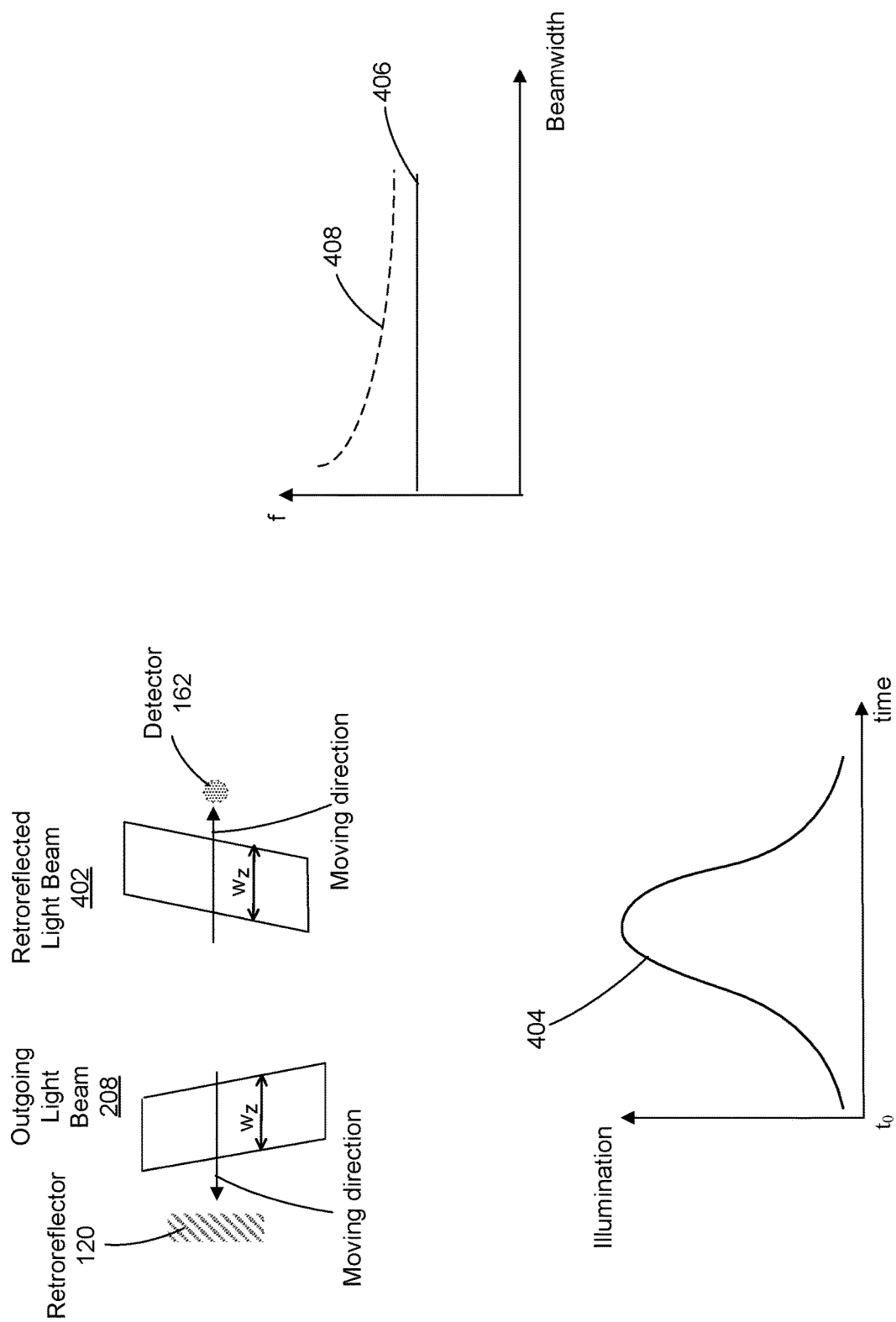
FIG. 4A illustrates an example illumination observed by a detector in response to being illuminated by a retroreflected light beam, in accordance with an embodiment.
FIG. 4B illustrates example frequency responses of a detector in relation to the beamwidth of the retroreflected light beam, in accordance with an embodiment.

FIG. 4A illustrates an example illumination observed by a detector in response to being illuminated by a retroreflected light beam, in accordance with an embodiment. For clarity, only one retroreflected light beam 402 is illustrated. The retroreflected light beam 402 is the outgoing light beam 208 retroreflected from a retroreflector 120 of an object in a local area. For a particular detector 162, an input illumination determines its output illumination data. Maintaining a constant apparent frequency in the retroreflected light beam 402 throughout the local area minimizes variances (e.g., a phase variance, an amplitude variance) in the output illumination data that are caused by different radial distances from the base station.

In the illustrated example, the retroreflected light beam 402 is a planar sheet beam and is moving relative to the detector 162. At a particular location in the local area, the beamwidth of the outgoing light beam 208 affects the apparent frequency observed by the detector 162 and can be regulated by positioning a location of the beam waist of the source light beam 207 relative to a center of the optical module 204. In this illustrated example, the center of the optical module 204 is positioned to overlap the location of the beam waist of the source light beam 207. In response to being illuminated by the outgoing light beam 208, the detector 162 outputs illumination data corresponding to an apparent frequency of the retroreflected light beam 402. The curve 404 represents the illumination data outputted by the detector 162. The detector 162 outputs illumination data at the time point $t_1$ due to group delay. The detector 162 outputs illumination data from $t_1$ to $t_2$. The apparent frequency of the retroreflected light beam 402 determines the curve 404. Because the center of the optical module 204 is positioned to overlap the beam waist of the source light beam 207, the outgoing light beam 208 as well as the retroreflected light beam 402 have substantially the same apparent frequency throughout the local area. If the object is positioned at different locations in the local area that are separated from the base station 135 by different radial distances, the detector 162 outputs the same or substantially the same illumination data because the illumination has the same or substantially the same apparent frequency.

FIG. 4B illustrates example frequency responses of a detector in relation to the beamwidth of the outgoing light beam 402, in accordance with an embodiment. The frequency response of the detector 162 can be determined by the apparent frequency of the light beam observed by the detector 162. The curve 406 represents a frequency response of the detector 162 if a center of the optical module 204 is positioned to overlap the beam waist of the source light beam 207. With the beamwidth of the outgoing light beam 208 varying at different locations in the local area, the detector's 162 output frequency response is substantially constant. The curve 408 represents a frequency response of the detector 162 if a center of the optical module 204 is positioned such that the beamwidth of the outgoing light beam 208 decreases for a threshold amount. With the beamwidth of the outgoing light beam 208 varying at different locations in the local area, the detector's 162 output frequency response varies within a threshold amount.

Figure 5:
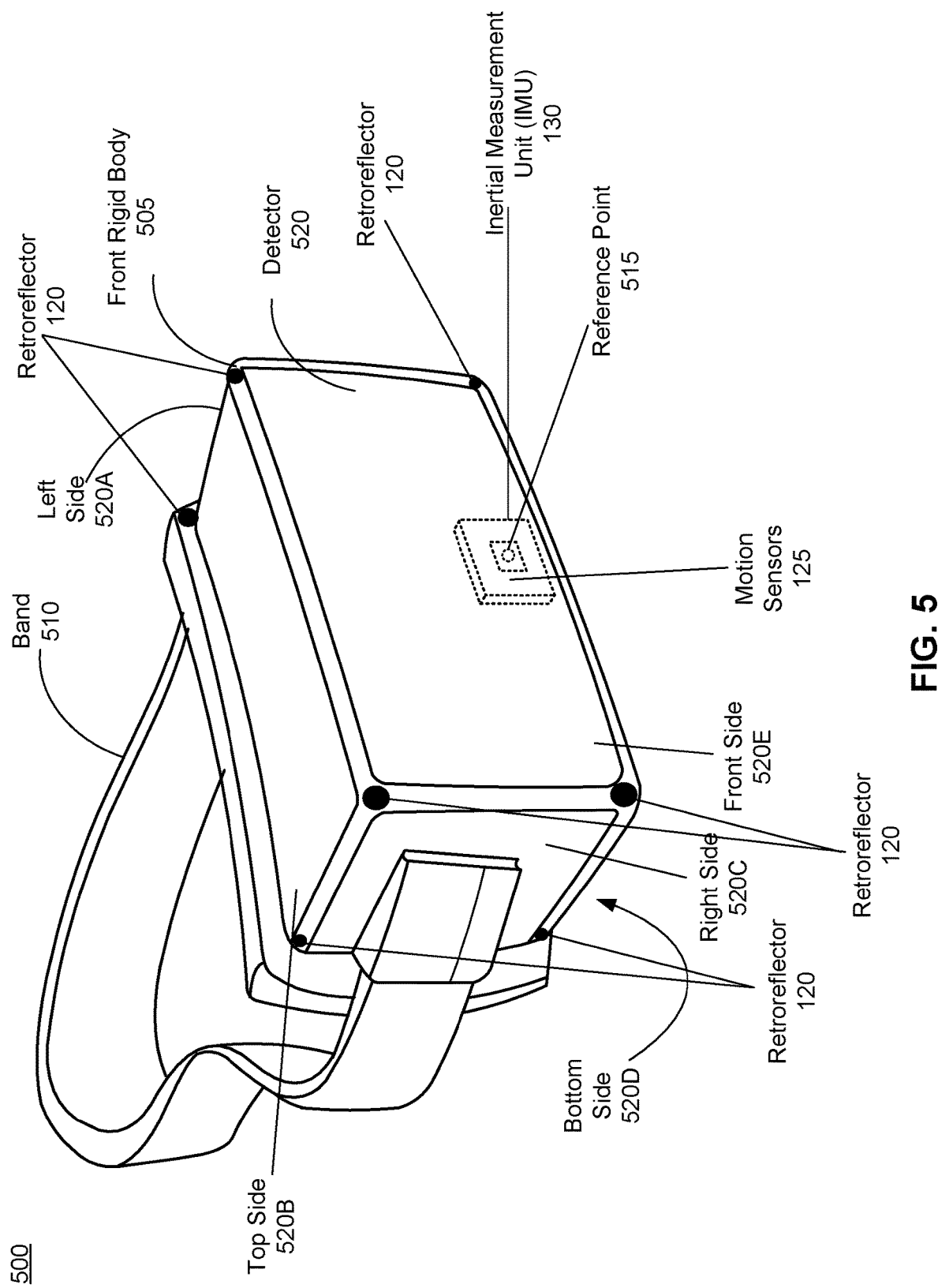
FIG. 5 is a diagram of an HMD, in accordance with an embodiment.

FIG. 5 is a diagram of a HMD 105, in accordance with an embodiment. The HMD 500 is an embodiment of the HMD 105, and includes a front rigid body 505 and a band 510. The front rigid body 505 includes one or more electronic display elements of the display 115 (not shown in FIG. 5) and the retroreflectors 120. The illustrated example show the retroreflectors 120 that are positioned on the front upper right corner, front lower right corner, front upper left corner, front lower left corner, right side upper left corner, right side lower left corner, and left side upper left corner of the HMD 105. The retroreflectors positioned on the left side lower left corner, back upper right corner, back lower right corner, back upper left corner, and back lower left corner of the HMD 105 are not shown. In other embodiments, the retroreflectors are not positioned the exterior surface of the HMD 105 such that they visible to a user.

The front rigid body 505 may further include the IMU 130 and/or the one or more motion sensors 125. In the embodiment shown by FIG. 5, the motion sensors 125 are located within the IMU 130, and neither the IMU 130 nor the motion sensors 125 are visible to the user. In the illustrated example, the reference point 515 is located at the center of the IMU 130.

Figure 6:
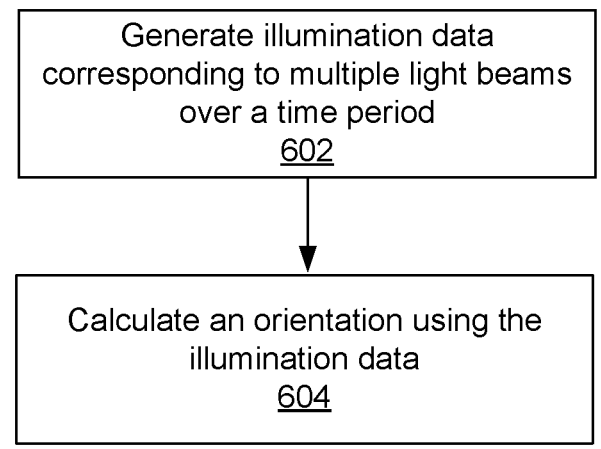
FIG. 6 is a flow chart illustrating an example process of determining an orientation of an object, in accordance with an embodiment.

FIG. 6 is a flow chart of an example process for the system 100 to determine an orientation of an object, according to one embodiment. The system 100 generates 602 illumination data corresponding to multiple light beams over a time period. Specifically, the base station 135 generates the multiple light beams to illuminate a local area where the object is located. The base station 135 (e.g., at least one detector coupled to the base station 135) detects light beams retroflected from the object and generates illumination data responsive to the detected retroreflected light beams. The illumination data includes a starting time point of illumination, an end time point of illumination, an intensity of illumination, other characteristics of illumination, or some combination thereof. The multiple light beams include two light beams for orientation determination. The two light beams rotate around a rotation axis at a rotational speed and are separated by an offset angle. The two light beams are planar sheet beams and tilted with respect to the orthogonal plane at opposite directions. The two light beams are generated from a source light beam that has a beam waist positioned within a distance range from a center of rotation on the rotation axis. In some embodiments, the base station 135 processes the illumination data. In other embodiments, the base station 135 provides the illumination data to the console 110 (e.g., the tracking module 150) for further processing. The console 110 receives the illumination data form at least one detector coupled to the base station.

The system 100 calculates 602 an orientation using the illumination data. The system 100 applies a model to the illumination data to determine the orientation of the object. The tracking module 150 warps the model to illumination data to determine an orientation of the object. The model observes relationships between illumination data and corresponding orientation of the object. For example, the model includes a spatial model of detector locations relative to a reference vector (e.g., a known position in the tracked object). The model may be selected based on the rotational speed $\omega_1$ and the offset angle $\alpha$. As another example, a model includes a model of intensity levels to incident angles. The tracking module 150 compares observed different intensity levels to the model to determine actual incident angle of the light beams onto detectors on a surface of the object thereby to determine an orientation of the surface.

The system 100 may determine illumination timing of the at least one detector from the illumination data. The system 100 may compare the illumination timing to the model to determine the orientation of the object. The illumination data includes a starting time point and an end time point of each illumination onto each of the at least one detector by each light beam. The system 100 may determine the rotational speed $\omega_1$ at which the first light beam and the second light beam rotate from the illumination data. The system 100 may determine the offset angle $\alpha$ from the illumination data.

The system 100 may provide calibration parameters for display to a user. The calibration parameters may instruct a user to position the object into predetermined positions.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A device comprising:
   an illumination source that generates one or more source light beams;
   an optical module positioned along a rotation axis to divide the one or more source light beams into a first light beam and a second light beam, the first light beam and the second light beam separated from each other by a constant angle in a plane orthogonal to the rotation axis; and
   a plurality of detectors positioned along an outer surface of the device, and at least one of the plurality of detectors is positioned to detect at least one light beam of the first light beam and the second light beam that is retroreflected from an object in a local area.

2. The device of claim 1, further comprising:
   a rotor assembly configured to rotate a portion of the optical module around the rotation axis such that the first beam and the second beam are output from the device to illuminate the local area in a direction that rotates around the rotation axis.

3. The device of claim 1, wherein the object includes a plurality of retroreflectors configured to retroreflect light in a band of light that includes the first light beam and the second light beam.

4. The device of claim 1, wherein the plurality of detectors are placed within a threshold distance of an output region of the device.

5. The device of claim 1, wherein the plurality of detectors include at least one avalanche photo diode.

6. The device of claim 1, wherein the first light beam and the second light beam are in an infrared band.

7. The device of claim 1, wherein the first light beam and the second light beam are shaped in planar sheets and are tilted with respect to the plane orthogonal to the rotation axis at opposite angles.

8. The device of claim 1, further comprising:
   a processing module configured to:
      apply a model to the illumination data to determine an orientation of the object.

9. A system comprising:
   an illumination device configured to:
      emit multiple light beams including a first light beam and a second light beam that rotate around a rotation axis to illuminate a local area, the first light beam and the second light beam separated from each other by a constant angle in a plane orthogonal to the rotation axis, wherein at least one light beam of the first light beam and the second light beam is retroreflected from an object in the local area,
      detect, via at least one detector of a plurality of detectors that are positioned along an outer surface of the device, illumination by the at least one light beam that is retroreflected from the object, and generate illumination data in response to the illumination; and the object including one or more retroreflectors configured to retroreflect light in a band of light that includes the first light beam and the second light beam.

10. The system of claim 9, further comprising:
a console communicatively coupled to the illumination device and including a processor configured to:
apply a model to the illumination data to determine an orientation of the object.

11. The system of claim 9, wherein the illumination device is further configured to:
apply a model to the illumination data to determine an orientation of the object.

12. The system of claim 9, wherein the plurality of detectors are placed within a threshold distance of an output region of the illumination device.

13. The system of claim 9, wherein the plurality of detectors include at least one avalanche photo diode.

14. The system of claim 9, wherein the first light beam and the second light beam are in an infrared band.

15. The system of claim 9, wherein the first light beam and the second light beam are shaped in planar sheets and are tilted with respect to the plane orthogonal to the rotation axis at opposite angles.

16. A device, comprising:
a processor, and
memory storing computer readable instructions configured to cause the processor to:
receive illumination data from at least one detector coupled to a illumination device, the illumination data generated in response to illumination by at least one light beam; and
apply a model to the illumination data to determine an orientation of an object in a local area,
wherein the at least one light beam is a first light beam and a second light beam retroreflected from the object, the first light beam and the second light beam illuminate the local area and rotate around a rotation axis, the first light beam and the second light beam are separated from each other by a constant angle in a plane orthogonal to the rotation axis, and are generated from a source light beam having a beam waist positioned within a distance range from a center of rotation on the rotation axis.

17. The device of claim 16, wherein the device is included in the illumination device.

18. The device of claim 16, wherein the device is communicatively coupled to the illumination device.

19. The device of claim 16, wherein the model comprises a spatial model of at least one location of the at least one detector relative to a reference vector.

20. The device of claim 16, wherein the computer readable instructions are further configured to cause the processor to:
determine illumination timing of the at least one detector from the illumination data; and
compare the illumination timing to the model to determine the orientation of the object,
wherein the illumination data includes a starting time point and an end time point of each illumination onto each of the at least one detector by each light beam.

21. The device of claim 16, wherein the computer readable instructions are further configured to cause the processor to:
determine a rotational speed of the first light beam and the second light beam; and
select the model based on the rotational speed.

22. The device of claim 16, wherein the computer readable instructions are further configured to cause the processor to:
determine the constant angle between the first light beam and the second light beam; and
select the model based on the constant angle.

23. The device of claim 16, wherein the computer readable instructions are further configured to cause the processor to:
provide calibration parameters for display to a user, the calibration parameters configured to cause the object to be positioned into predetermined positions.

24. The device of claim 16, further comprising the at least one detector.

25. A computer-implemented method, comprising:
receiving illumination data from at least one detector coupled to a illumination device, the illumination data generated in response to illumination by at least one light beam; and
applying a model to the illumination data to determine an orientation of an object in a local area,
wherein the at least one light beam is a first light beam and a second light beam retroreflected from the object, the first light beam and the second light beam illuminate the local area and rotate around a rotation axis, the first light beam and the second light beam are separated from each other by a constant angle in a plane orthogonal to the rotation axis, and are generated from a source light beam having a beam waist positioned within a distance range from a center of rotation on the rotation axis.

26. A computer-implemented method of claim 25, wherein the model comprises a spatial model of at least one location of the at least one detector relative to a reference vector, further comprising:
determining illumination timing of the at least one detector from the illumination data; and
comparing the illumination timing to the model to determine the orientation of the object applying a model to the illumination data to determine an orientation of the object.

27. The computer-implemented method of claim 25, further comprising:
determining a rotational speed of the first light beam and the second light beam; and
selecting the model based on the rotational speed.

28. The computer-implemented method of claim 25, further comprising:
determining the constant angle between the first light beam and the second light beam; and
selecting the model based on the constant angle.

29. The computer-implemented method of claim 25, further comprising:
providing calibration parameters for display to a user, the calibration parameters configured to cause the object to be positioned into predetermined positions.

* * * * *